UNITED STATES PATENT OFFICE.

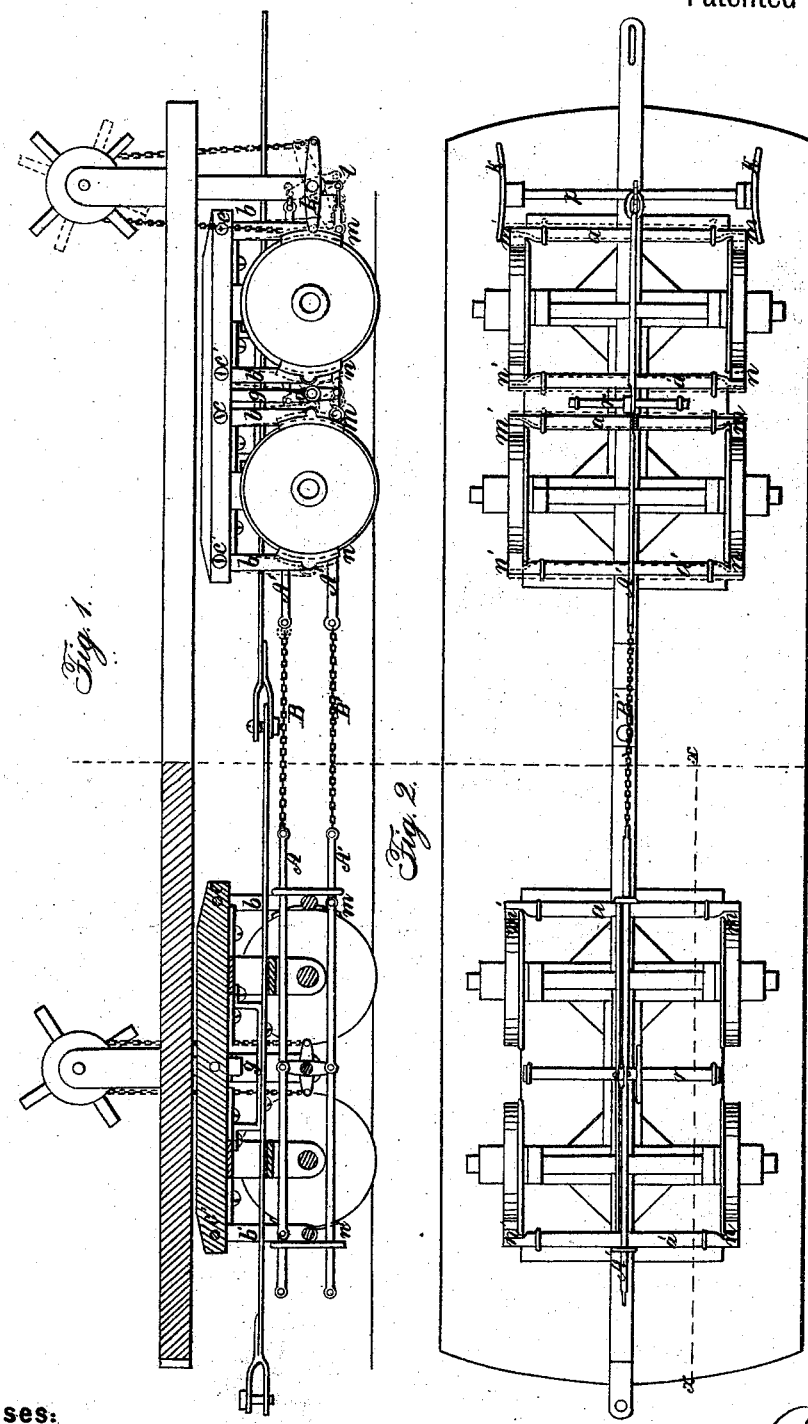

HENRY H. TRENOR, OF NEW YORK, N. Y.

IMPROVED CAR-BRAKE.

Specification forming part of Letters Patent No. 57,015, dated August 7, 1866.

*To all whom it may concern:*

Be it known that I, HENRY HUDSON TRENOR, of New York, in the county and State of New York, have invented certain new and useful Improvements in Mechanisms for Operating Car-Brakes; and I hereby declare the following to be a full, clear, and exact description of the same, reference being had to the accompanying drawings, in which—

Figure 1 represents, in section and in elevation, the platform and running-gear to which my improved mechanism has been applied. Fig. 2 represents a plan view of the same, looking up from underneath the car.

The red lines in the right-hand truck in Figs. 1 and 2 show the position of the brakes and mechanism for actuating the same when the crank is turned so as to draw the brakes from the peripheries of the wheels. The section in Fig. 1 is on the line $x\ x$, Fig. 2.

My invention relates to the improved mechanism for actuating car-brakes for which Letters Patent of the United States numbered 50,517 were granted me on the 17th October, 1865. In those Letters Patent was shown a method of operating car-brakes by means of eccentrics so arranged that the brakes might be applied simultaneously to the opposite sides of the wheels of a truck of a single car or of a whole train of cars. My present invention is subordinate in principle to that method; and it consists, mainly, in improvements in mechanism for carrying it into effect.

In an application now pending in the United States Patent Office I have shown another arrangement of mechanism for applying the same method, whereby the rods connecting the brakes are actuated by a system of cranks and levers, as therein explained, the rods and cranks to which they are pivoted being moved horizontally or in a plane parallel to the bottom of the car.

In my present application the mechanism is shown arranged for what I call "vertical action," in contradistinction to the above arrangement just mentioned—that is to say, the rods actuating the brakes, being parallel to each other, are actuated by cranks moving on a horizontal axis.

To enable others to fully understand and to use my invention, I will now proceed to describe it by reference to the drawings.

On each wheel and diametrically opposite each other are the brakes $m\ n\ m'\ n'$. The two brakes $m\ m'$, on the same side of the same pair of wheels, are connected by means of a rod or bar, $a$, which stretches across from the one brake to the other and holds the two firmly together. This bar is held to the body of the truck by pendent lever-arms $b\ b$, which are secured to the bar and, extending therefrom, are pivoted to the frame or body of the truck at $c\ c$. The two arms and the transverse bar $a$, to the ends of which the brakes are secured, thus constitute a frame, which, being pivoted to the truck, is capable of rocking or oscillatory motion, whereby the brakes may be withdrawn from or pressed against the wheels.

The brakes $n\ n'$, respectively opposite to the brakes $m\ m'$, are secured to the truck and held in place in a similar manner by the transverse bar $a'$ and the two arms $b\ b'$, pivoted to the truck at $c'\ c'$.

The brakes thus arranged and mounted on frames are operated through the medium of the rods or links A A', which extend under each truck and throughout its length. These rods, parallel to the bed of the car and to each other, are arranged one above the other, as seen in Fig. 1.

In the center of each truck, between the two axles of the car-wheels, is a rock-shaft, $r$, supported in bearings in the uprights $g$, which latter are secured to the body of the truck. The rock-shaft $r$, as shown in the drawings, is transverse to the length of the cars, being parallel to the bars $a\ a'$ and level with them, or held at the same distance from the wooden body of the truck. About midway on each shaft is mounted a double crank in a plane vertical to the platform of the car. Similar cranks are formed on each of the transverse connecting-bars $a'\ a'$.

The links or rods A A' are so placed that one shall be above and the other below the rock-shaft $r$ and cross-bars $a\ a'$, as shown in Fig. 1, where the rod A is placed above and the rod A' below the rods, the cranks on the rock-shaft and cross-bar lying in the same vertical plane. The upper rod, A, in each truck is pivoted to the upper end of the crank-piece $d$; and the lower rod, A', to the lower end of the same. The rods A A' are also pivoted alternately to the cranks of the cross-bars $a$ $a'$, as seen in the drawings, the rod $A'$ being secured to the cranks $a\ a$ of the brakes $m\ m'$, and the rod $A$ in like manner attached to the bars $a'\ a'$ of the brakes $n\ n'$, so that each rod actuates all the brakes of the car or truck occupying the same relative position on the wheels with which they are used. The brakes and rods thus arranged are operated by means of a rock-shaft, $p$, on which is mounted a crank, $l$, Fig. 1. To this crank are attached the rods $A\ A'$ in any suitable manner. On the same shaft a crank, $k$, is also mounted, but at right angles to the crank $l$, connected with a windlass or winding-shaft on the car-platform by means of a chain which is first secured to one end of the crank, thence passed up through the platform and over the windlass, around which it is tightly wound two or three times, and is then carried below the platform, and, being drawn taut, is fastened to the other end of the crank.

By this arrangement, it will be seen that a slight turn of the windlass will suffice to withdraw the brakes from or to apply their full force to the wheels. In the right-hand truck, in Figs. 1 and 2, the position of the brakes and mechanism for actuating them when the brakes are not in contact with the wheels is represented in red lines.

The wheel is shown as having been turned to the left, and it will be seen that, owing to the cranks $d\ d$, the power by which the lower rod, $A'$, carrying with it the brakes $m\ m'$, is drawn in one direction causes the rod $A$ to move in exactly an opposite direction, by which the brakes $n\ n'$, opposite the brakes $m\ m'$, are also withdrawn from the wheels.

The rods $A\ A'$ on the different trucks of the same car (or of different cars, if it be desired to connect the mechanism of more than one car or of the whole train) are connected by chains $B\ B'$, and when thus connected the brakes of one or more cars or the whole train may be operated by one person, either by hand or by steam, so that the brakes may be instantaneously and simultaneously applied to all the cars of the train.

As stated in the opening part of this specification, it will be readily seen that the double cranks for actuating the rods $A\ A'$ may work horizontally as well as vertically without departing from the principle of my invention. In case the mechanism is arranged for horizontal action, the cranks should be pivoted to frames occupying the same position now held by the rock-shafts $r$, so as to work horizontally or in a plane parallel to the bed of the car. This would, of course, necessitate a like change also in the position of the rods $A\ A'$. This latter arrangement, however, has been fully explained and set forth in an application now pending before the Office, and it is therefore not deemed necessary to describe such arrangement in detail, especially as it is identical in principle with the subject of the present application.

Having thus described my invention, what I claim, and desire to secure by Letters Patent, is—

The arrangement and alternating connection of the brakes, as herein described, by means of rods actuated by cranks mounted on horizontal or vertical axes, and vibrated through the intermediary of chain and windlass or the mechanical equivalent thereof, by hand, steam, or other power.

In testimony whereof I have signed my name to this specification before two subscribing witnesses.

HENRY H. TRENOR.

Witnesses:
WM. G. CHOATE,
H. B. HATHAWAY.